UNITED STATES PATENT OFFICE.

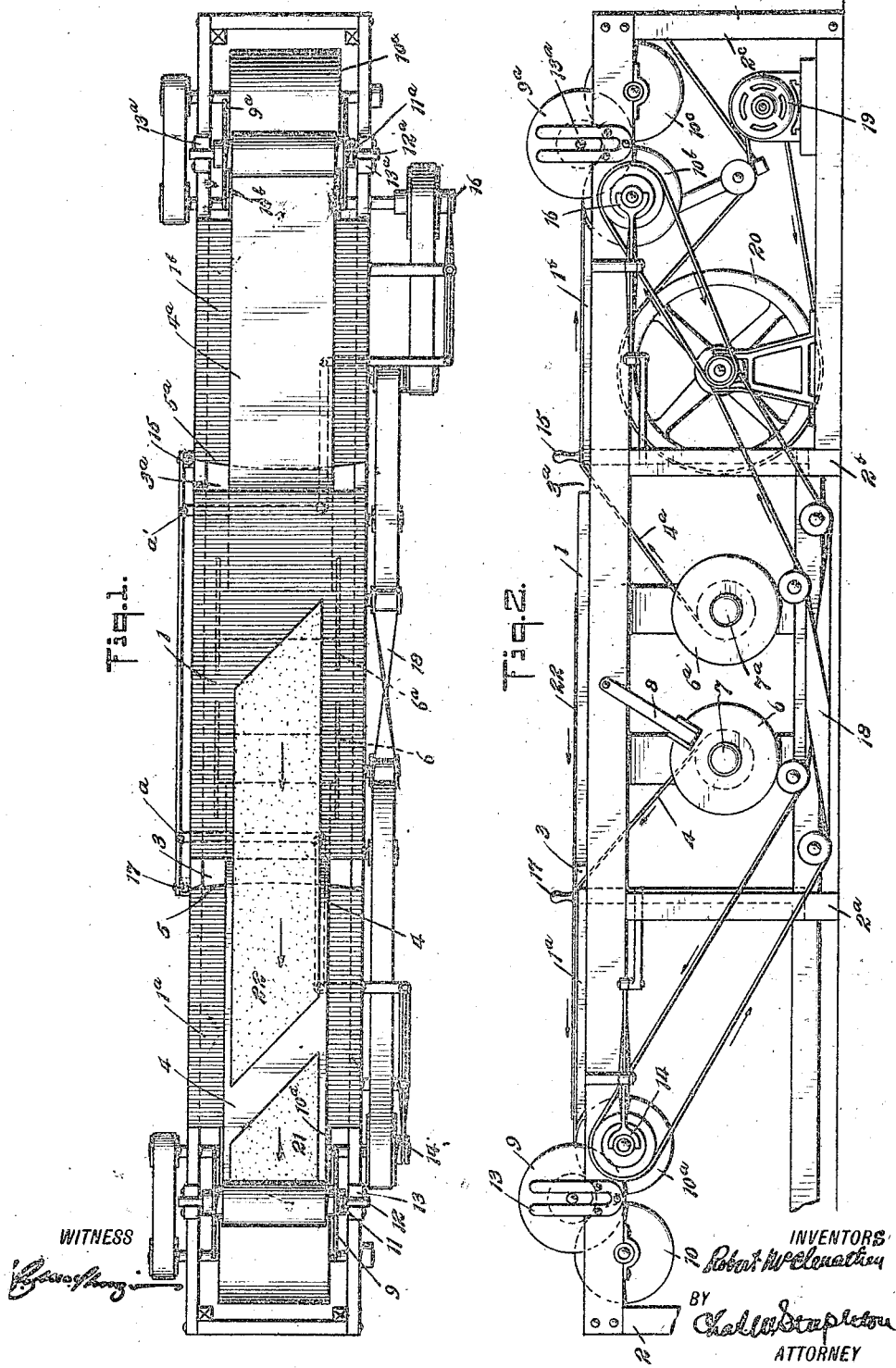

ROBERT McCLENATHEN, OF CUYAHOGA FALLS, OHIO, ASSIGNOR TO KELLY-SPRING-FIELD TIRE COMPANY, OF NEW YORK, N. Y., A CORPORATION.

MACHINE FOR WINDING UP STRIPS OF STICKY MATERIAL.

1,303,821.          Specification of Letters Patent.        Patented May 13, 1919.

Application filed October 2, 1918. Serial No. 256,533.

*To all whom it may concern:*

Be it known that I, ROBERT MCCLENA-THEN, a citizen of the United States, residing at Cuyahoga Falls, in the county of Summit and State of Ohio, have invented a new and useful Machine for Winding Up Strips of Sticky Material.

The manufacture of rubber tires, especially pneumatic rubber tire casings, involves handling large quantities of sticky, gummy material, usually coarsely woven fabric coated over with unvulcanized rubber, finally cut into strips diagonally of the weave.

To handle these sticky strips as they are delivered from the cutting machine, more expeditiously and effectively than has formerly been done, I place a table of special construction at the end of the bed of the cutting machine, equipped with spools and drums to reel up continuous strips of uncoated cloth called liners or perhaps more correctly, conveyers, simultaneously with the short strips of coated fabric as they are delivered from the cutting machine, thus keeping the sticky surfaces separated and free from dirt and other foreign substances. I use a table with like mechanism at each end so that either end can be operated independently of the other, which permits continuous operation of my reeling apparatus and also of the fabric cutting machine while spools are being changed.

I have also arranged for rotating the receiving spools at a variable speed so that the fabric and liner is fed to the receiving spool with a uniform velocity, the result being a large saving in labor and in the continuous operation of the fabric cutting machine.

In the annexed drawing, Figure 1 is a top plan view of the entire apparatus. Fig. 2 is a side view of the same.

Like numerals refer to like parts in all figures.

The machine consists of a flat center table 1, and flat end tables, 1$^a$, 1$^b$, mounted on suitable supports 2, 2$^a$, 2$^b$, 2$^c$. The tables are divided by transverse slots 3, 3$^a$, through which the empty conveyer cloths 4, 4$^a$ travel up and pass over the curved ends 5, 5$^a$ of tables 1$^a$, 1$^b$.

The empty conveyer cloths 4, 4$^a$ are held on feeding spools 6, 6$^a$ supported on centers 7, 7$^a$. Movable arm 8 holds feeding spool 6 on the center and also acts as a brake to maintain proper tension on conveyer 4; and when feeding spool 6 is being replaced and feeding spool 6$^a$ is in operation, arm 8 is swung over and performs the same function for feeding spool 6$^a$. The short strips of gummy fabric and long continuous liner (conveyer cloths) are wound up on receiving spools 9, 9$^a$, which receiving spools are rotated at a variable speed by contact with drums 10, 10$^a$, 10$^b$, 10$^c$. The drums running at constant speed, drive the receiving spools 9, 9$^a$ by friction contact with the conveyer cloth wound upon the receiving take-up spools 9, 9$^a$. These receiving spools of course revolve more slowly as the conveyer cloth and inclosed gummy fabric wound thereon increases the area of the surface for contact, resulting in the moving conveyer carrying off the strips of gummy fabric at a constant speed as they regularly fall upon the table delivered from the cutting machine. Removable centers 11, 11$^a$ with fixed shafts 12, 12$^a$ in the removable centers, are placed in the receiving spools 9, 9$^a$ and these receiving spools with the center shafts are then laid on the top of the drums 10, 10$^a$, 10$^b$, 10$^c$, being held in place by means of the guide bars 13, 13$^a$. Clutch pulleys 14 and 16 are controlled by the movement of either lever 15 or 17, but a one-end independent operation is obtained by the removal of either connecting pin $a$ or $a'$. A twisted belt 18 rotates the drums on either end in the proper direction. The apparatus is driven by motor 19 which is belted to drive wheel 20 which in turn communicates power to drum 10$^a$ through belt 18 and also to drum 10$^b$ by a short connecting belt as shown in the drawing Fig. 2. Drum 10 is driven by belt connection with drum 10$^a$ and drum 10$^c$ by belt connection with drum 10$^b$ as shown in the drawing Fig. 1. A piece of fabric 21, is shown nearly wound up, and another piece 22 on its way.

In the operation of the machine, a strip of gummed fabric from the cutting machine is dropped upon the table 1 at such point that one end thereof falls upon the moving cloth conveyer 4 or 4$^a$ as the case may be, to which it adheres sufficiently to be dragged from the central portion of the table when it is carried along and wound up together with the cloth conveyer on the spool 9 or 9ª, according to which end is running. When a receiving spool—say spool 9—is filled, lever 15 is thrown over, which disconnects clutch 14 from drum 10 and simultaneously connects clutch 16 with drum 10ᵇ, thus keeping one end in constant operation while the other is stopped for changing spools or other purposes.

It is apparent that both ends may be operated simultaneously by separating the lever control; but in practice, we find that a constant operation of either end is sufficient to take care of the delivery of a fabric cutting machine, but if the apparatus be only one ended, it is clear there cannot be constant operation as considerable time is necessarily consumed in removing the empty, and substituting filled feeding spools and in removing filled, and substituting empty receiving spools, during which both the cutting machine and the reeling apparatus must stand idle.

Having described my invention, I claim:

1. An apparatus for reeling fabric consisting of a table having a transverse opening, a supply spool located below said table, a take-up spool supported by two revolving driving drums, means to rotate said take-up spool whereby said supply spool is rotated, a cloth conveyer passing from the supply spool through said transverse opening to the take-up spool in a manner whereby strips of sticky material may be fed from said table across said opening to said cloth prior to its engagement by said take-up spool, means for holding said take-up spool and contents parallel with said driving drums in an automatically adjustable manner, and means for holding said cloth conveyer at proper tension, substantially as described.

2. An apparatus for reeling fabric consisting of a table having two transverse openings with a portion thereof intervening between said openings, two supply spools located below said table, a take-up spool supported by two revolving driving drums at each end of said table, means to rotate either of said take-up spools whereby either supply spool is rotated, a cloth conveyer passing from the respective supply spools through the respective transverse openings to the adjacent take-up spools whereby a portion of the table is free from either conveyer cloth, means to hold each conveyer cloth at proper tension, and a lever in common adapted to bring either set of driving drums into operation whereby a workman may stop one set of drums and start the other set by the same movement.

3. An apparatus of the character described a supply spool, a take up spool supported by two stationarily held revolving drums, a stationary supporting table intervening between the said supply spool and said take up spool, means to drive said drums and rotate said take up spool, a cloth conveyer passing from said supply spool over said table to said take up spool and adapted to carry and wind up strips of sticky material on said take up spool and in a manner that will rotate said supply spool, means for holding said take up spool and contents parallel with said driving drums in an automatically, adjustable manner and means for holding said cloth conveyer at proper tension substantially as described.

ROBERT McCLENATHEN.